(12) United States Patent
Sugimoto (10) Patent No.: US 8,353,100 B2
(45) Date of Patent: Jan. 15, 2013

(54) DISASSEMBLY APPARATUS OF ROTATING ELECTRIC MACHINE

(75) Inventor: Tatsuo Sugimoto, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/046,454

(22) Filed: Mar. 11, 2011

(65) Prior Publication Data

US 2011/0162194 A1 Jul. 7, 2011

Related U.S. Application Data

(63) Continuation-in-part of application No. PCT/JP2008/002559, filed on Sep. 17, 2008.

(51) Int. Cl.
*B23P 19/00* (2006.01)
*H02K 15/00* (2006.01)

(52) U.S. Cl. .............................. 29/732; 29/596; 212/331

(58) Field of Classification Search ............ 29/732–736, 29/596, 729, 739, 278, 281, 714; 212/331; 425/63, 117, 436 R, 166; 249/137, 120, 249/161
See application file for complete search history.

(56) References Cited

U.S. PATENT DOCUMENTS

| | | | | |
|---|---|---|---|---|
| 3,640,658 A * | 2/1972 | Price | | 425/63 |
| 4,381,839 A * | 5/1983 | Engler et al. | | 212/314 |
| 4,775,313 A * | 10/1988 | DiIoia | | 425/458 |
| 5,332,191 A * | 7/1994 | Nolan | | 249/155 |
| 7,000,460 B1 * | 2/2006 | Cline et al. | | 73/116.03 |
| 7,395,594 B2 * | 7/2008 | Allen et al. | | 29/596 |
| 7,467,723 B2 * | 12/2008 | Zaguroli, Jr. | | 212/331 |
| 7,484,290 B2 * | 2/2009 | Henley | | 29/598 |

FOREIGN PATENT DOCUMENTS

| JP | 11-335074 | 12/1999 |
|---|---|---|
| JP | 2003-165680 | 6/2003 |

OTHER PUBLICATIONS

International Search Report issued Dec. 2, 2008, from the Japanese Patent Office in International Application No. PCT/JP2008/002559.
International Preliminary Report on Patentability and Written Opinion issued by the International Bureau of WIPO on Apr. 28, 2011, for International Application No. PCT/JP2008/002559.

* cited by examiner

*Primary Examiner* — Minh Trinh
(74) *Attorney, Agent, or Firm* — Finnegan, Henderson, Farabow, Garrett & Dunner, L.L.P.

(57) ABSTRACT

A disassembly apparatus of a power generator installed in a nacelle has an I-shaped beam, a pressing plate, anchor bolts, a trolley and a chain block. The I-shaped beam extends horizontally above the frame of the power generator. The pressing plate is disposed on the I-shaped beam. The anchor bolts extend along both sides of the I-shaped beam to pierce the pressing plate and are screwed into threaded holes extending downward of the frame. The trolley is provided movably to roll on the upper surface of the lower flange. The chain block is hung from the trolley. The flange removed from the frame is hung and moved vertically by the chain block, and is moved horizontally by the trolley.

8 Claims, 9 Drawing Sheets

DISASSEMBLY APPARATUS OF ROTATING ELECTRIC MACHINE

CROSS REFERENCE TO RELATED APPLICATIONS

This application is a continuation-in-part (CIP) application based upon the International Application PCT/JP2008/002559, the International Filing Date of which is Sep. 17, 2008, the entire content of which is incorporated herein by reference.

BACKGROUND OF THE INVENTION

The present invention relates to a disassembly apparatus and disassembly method of a rotating electric machine installed in a limited space, such as a wind power generator housed in a nacelle, for example.

A wind power generator is housed in a nacelle that is for example provided on the top of a 60-meter or so pole extending from the ground. A rotating shaft of the wind power generator is connected, via a step-up gear or the like that is similarly housed in the nacelle, to blades that are located outside the nacelle and are rotated by wind power.

A rotating electric machine such as the wind power generator could be disassembled and assembled for regular maintenance or for repairs when the rotating electric machine breaks down. The rotating electric machine has many heavy parts and it is difficult for a worker to move them without using equipment. Therefore, in a power generator disassembly/assembly operation, the power generator is taken down to the ground by a large crane and then an operation of disassembling and assembling the power generator is performed.

The operation of lifting down and up the power generator with the large crane is impossible in some weather conditions. That is, even when some trouble happens, it may not be easy to take the power generator down to the ground. Moreover, in taking the power generator down to the ground, it takes a lot of time and effort to disconnect the cables of the power generator and to do other work. For the above reasons, it is difficult to make a quick recovery with the method of disassembling and assembling the power generator after the power generator is taken down to the ground.

For example, what is disclosed in Patent Document 1 (Japan Patent Application Laid-open Publication No. 11-335074, the entire content of which is incorporated herein by reference) is a jig that is used in disassembling and assembling a power generator. The jig includes leg members, which are fixed on both sides of the power generator; a lateral member, which is provided between the leg members; and a rail section, which is attached to the lateral member.

If a rotating electric machine is installed in a limited space such as nacelle, it is difficult to carry the jig into the limited space. In case where the location is high above the ground such as the wind power generator, even if a nacelle is removed, only an extremely large crane can be used for disassembling and assembling.

Because the leg members of the jig disclosed in Patent Document 1 extend high above a casing of the power generator, in order for the jig to be attached to the power generator, a rectangular space surrounding an upper portion of the power generator, when viewed in the direction facing a rotating shaft, is required. Thus, it may be impossible to use the jig disclosed in Patent Document 1 at a place where the power generator is installed in a limited space.

BRIEF SUMMARY OF THE INVENTION

The present invention has been made to solve the above problems, and object of the present invention is to make it easy to disassemble a rotating electric machine installed in a limited space.

In order to achieve the object described above, according to the present invention, there is provided a disassembly apparatus of a rotating electric machine having a frame on which at least two threaded holes extended downward are formed, the disassembly apparatus comprising: an I-shaped beam having an upper flange, a lower flange and a web located between the upper flange and the lower flange and extending horizontally above the frame; a pressing plate disposed on the I-shaped beam; two anchor bolts positioned on opposite sides of the I-shaped beam, extending through the pressing plate and being screwed into the threaded holes; a trolley that can move by rolling on a upper surface of the lower flange; and a crane that hangs from the trolley.

According to the present invention, there is also provided a disassembly method of a rotating electric machine having a frame on which at least two threaded holes extended downward are formed, and a rotating shaft partly housed in the frame, the disassembly method comprising: a step of disposing an I-shaped beam having an upper flange, a lower flange and a web located between the upper flange and the lower flange above the frame so that the I-shaped beam runs parallel to the rotating shaft and at least a part of the I-shaped beam projecting from the frame; a step of disposing a pressing plate on the I-shaped beam; a step of piercing two anchor bolts through the pressing plate and screwing the two anchor bolts into the threaded holes; a step of disposing a trolley so that the trolley can move by rolling on a upper surface of the lower flange; a step of hanging a crane on the trolley; a step of removing parts from the rotating electric machine; and a step of moving the trolley along the I-shaped beam while the parts is hung from the crane.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION OF THE INVENTION

An embodiment of a disassembly apparatus of a rotating electric machine according to the present invention will be described below with reference to the accompanying drawings.

Figure 3:
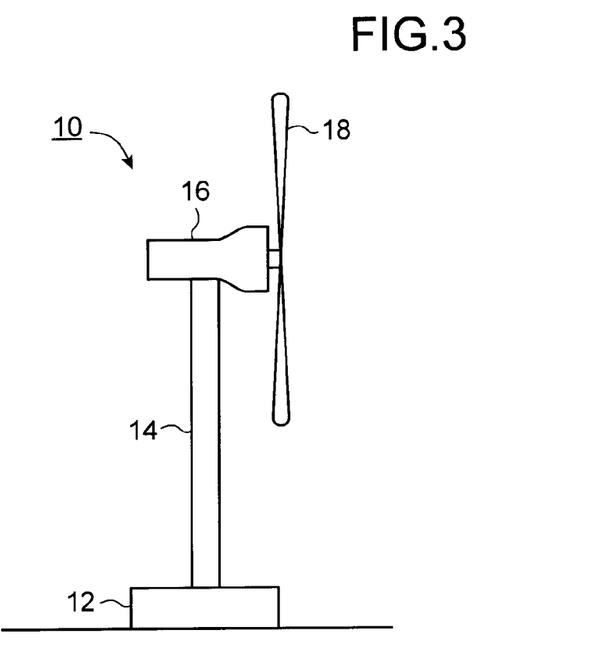
FIG. 3 is a side view of a wind power generation facility including a power generator that is to be disassembled and assembled by a disassembly apparatus of a rotating electric machine according to an embodiment of the present invention.
Figure 4:
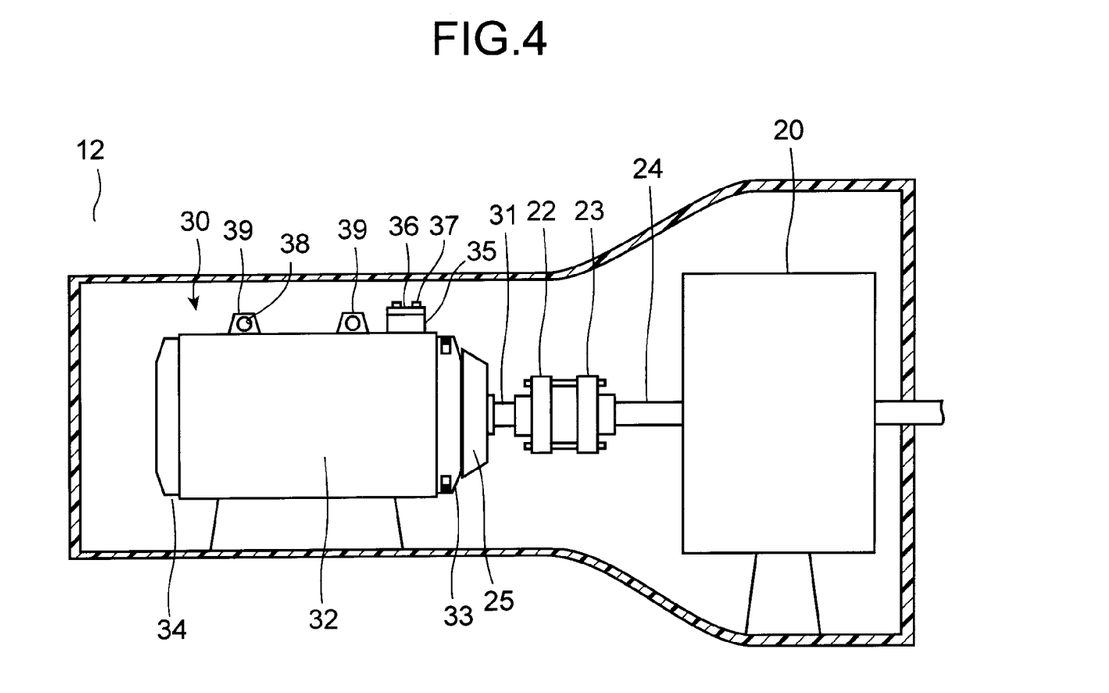
FIG. 4 is a side view of the inner part of a nacelle according to an embodiment of the present invention.

FIG. 3 is a side view of a wind power generation facility including a power generator that is to be disassembled and assembled by a disassembly apparatus of a rotating electric machine according to an embodiment of the present invention. FIG. 4 is a side view of the inner part of a nacelle according to the present embodiment.

A wind power generation facility 10 includes a base 12; a pole 14, which extends upward from the base 12; a nacelle 16, which is provided on the top of the pole 14; and blades 18. In the nacelle 16, a power generator 30 and a step-up gear 20 are provided. A rotating shaft 31 of the power generator 30 is connected to a shaft 24 of the step-up gear 20 via couplings 22, 23. The rotation of the blades 18 by wind power is transferred to the power generator 30 via the step-up gear 20, and the power generator 30 generates electricity.

The power generator 30 includes a cylindrical frame 32 and two brackets 33 and 34, which cover both ends of the frame 32. The rotating shaft 31 of the power generator 30 pierces through the bracket 33, which is closer to the coupling 22 than the bracket 34 is. Between the coupling 22 and bracket 33, an external fan 25 is fitted on the rotating shaft 31.

On the upper side of the frame 32, a terminal base 35 is provided. The top surface of the terminal base 35 is covered with a cover 36, and the cover 36 is fixed on the terminal base 35 with a plurality of bolts 37 that extend downward. On the top surface of the frame 32, two lift sections 39, on which lift holes 38 piercing therethrough are formed, are provided. The height of a gap between the top surface of the cover 36 of the terminal base 35 or the top end of the lift section 39 and the upper inner wall of the nacelle is, for example, about 20 centimeters.

Figure 1:
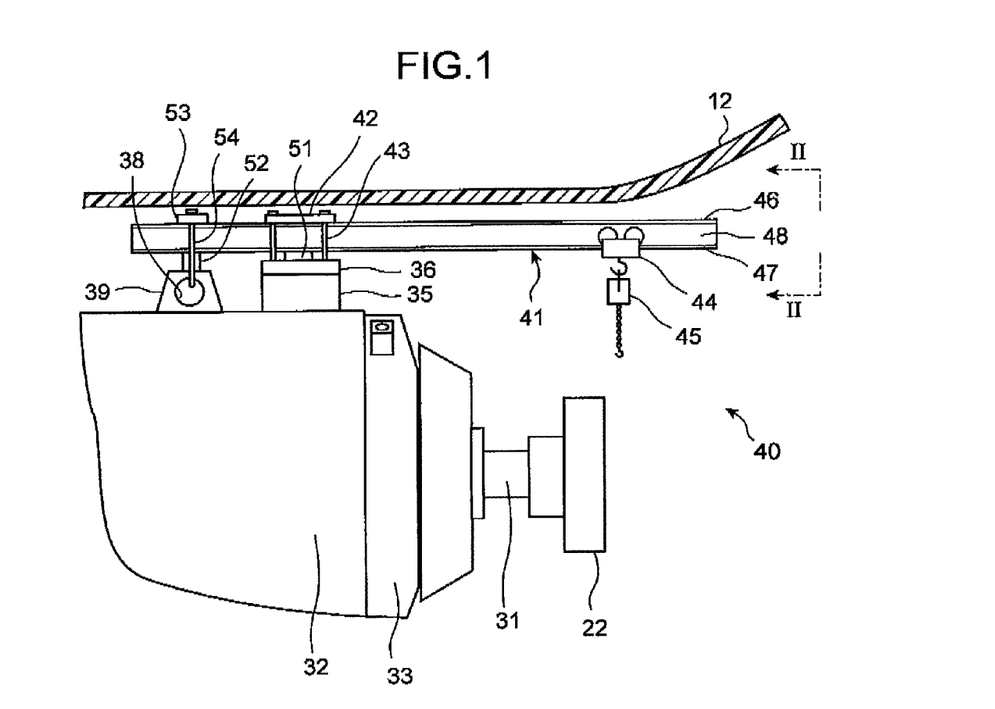
FIG. 1 is a side view showing a disassembly apparatus of a rotating electric machine according to an embodiment of the present invention, as well as a power generator that is to be disassembled and assembled.
Figure 2:
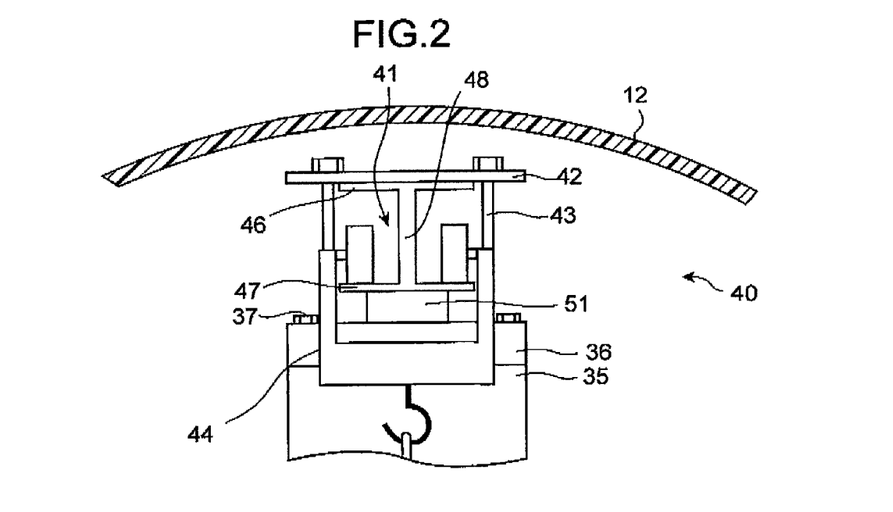
FIG. 2 is a front view, viewed in the direction of the arrows II-II in FIG. 1, showing the disassembly apparatus of the rotating electric machine according to an embodiment of the present invention, as well as the power generator that is to be disassembled and assembled.

FIG. 1 is a side view showing a disassembly apparatus of a rotating electric machine according to the present embodiment, as well as a power generator that is to be disassembled and assembled. FIG. 2 is a front view, viewed in the direction of the arrows II-II in FIG. 1, showing the disassembly apparatus of the rotating electric machine according to the present embodiment, as well as the power generator that is to be disassembled and assembled.

A disassembly apparatus 40 of the rotating electric machine includes an I-shaped beam (universal beam) 41, a pressing plate 42, anchor bolts 43, a trolley 44, and a chain block 45. The I-shaped beam 41 includes a pair of flanges 46, 47 and a web 48 which is positioned between the flanges 46, 47. The I-shaped beam 41 extends in the horizontal direction above the frame 32. The length of the I-shaped beam 41 is, for example, about 2 meters.

The I-shaped beam 41 is put on the frame 32 so as to be vertically above the rotating shaft 31 via height adjustment blocks 51, 52, which are provided on the cover 36 of the terminal base 35 and the lift section 39, respectively. The two height adjustment blocks 51, 52 are different in height, with the difference matching the difference in height between the top surface of the cover 36 of the terminal base 35 and the top surface of the lift section 39. A portion of the I-shaped beam 41 projects outside the frame 32 more than the bracket 33 which is closer to the coupling 22 than the bracket 34 is.

The pressing plate 42 is disposed on the I-shaped beam 41. Through holes are made on the pressing plate 42, and the anchor bolts 43 extend vertically through the through holes. The anchor bolts 43 are screwed into threaded holes from which bolts 37 that have been used to fix the cover 36 of the terminal base 35 are removed.

Above the lift section 39, a fixing plate 53 is provided. On the fixing plate 53, a fixing member 54 which extends through the lift hole 38, is fixed at two points across the I-shaped beam 41. The fixing member 54 is, for example, a U-shaped metallic rod. Because the I-shaped beam 41 is fixed in this manner by the pressing plate 42 as well as by the fixing plate 53 located at a different position from the pressing plate 42 in a direction which the I-shaped beam 41 extends, the horizontal movement of the I-shaped beam 41 is restricted. Therefore, it is easier to carry out disassembly/assembly operation.

The trolley 44 is attached so that the trolley 44 can move by rolling on the top surface of the lower flange 47 of the I-shaped beam 41. The chain block 45 which is a crane, hangs from the trolley 44.

The following describes a process of disassembling the power generator 30 using the disassembly apparatus 40.

At first, the components of the disassembly apparatus 40 are transported into the nacelle 16. To carry each component of the disassembly apparatus 40 is easier than to carry all the components together. The wind power generation facility may have a small winch that carries a one-ton or so object. Any of the components of the disassembly apparatus according to the present embodiment can be carried by such a small winch.

Of the bolts 37 that fix the cover 36 of the terminal base 35, those screwed into the threaded holes, into which the anchor bolts 43 of the disassembly apparatus 40 are screwed, are removed in advance. Then, the disassembly apparatus 40 is assembled so as to be in the state shown in FIGS. 1 and 2. The disassembly apparatus 40 thus assembled is used to carry out disassembly/assembly operation.

In the disassembly operation, the couplings 22, 23 between the power generator 30 and the step-up gear 20, which is an external rotating body, are disconnected at first. As a result, between the coupling 22 of the power generator 30 and the step-up gear 20, a space is formed. Then, the coupling 22 at the side of the power generator 30 is removed from the rotating shaft 31.

Figure 5:
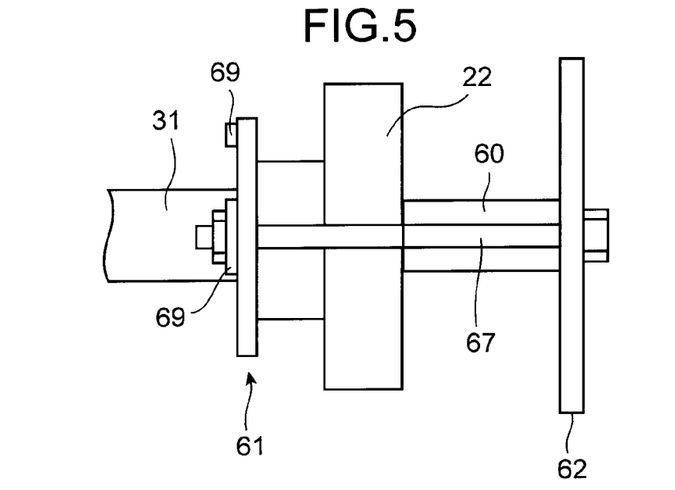
FIG. 5 is a side view of a situation where jigs for removing the coupling at the side of the power generator are attached according to an embodiment of the present invention.
Figure 6:
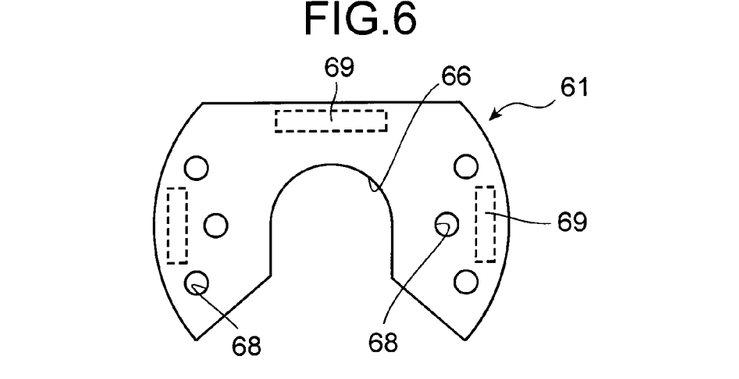
FIG. 6 is a front view of a first jig that is used to remove a coupling according to an embodiment of the present invention.
Figure 7:
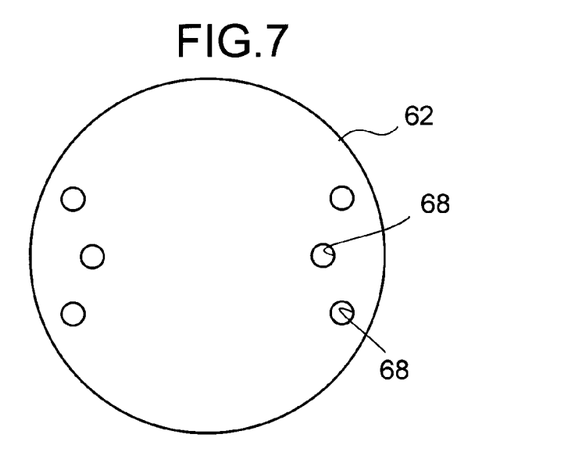
FIG. 7 is a front view of a second jig that is used to remove a coupling according to an embodiment of the present invention.

FIG. 5 is a side view of a situation where jigs for removing the coupling at the side of the power generator are attached according to the present embodiment. FIG. 6 is a front view of a first jig that is used to remove a coupling according to the present embodiment. FIG. 7 is a front view of a second jig that is used to remove a coupling according to the present embodiment.

A first jig 61 is a plate on which a piercing section 66 that is larger than the rotating shaft 31 and smaller than the coupling 22 is formed. The piercing section 66 extends from an outer edge. A second jig 62 is a circular plate. On the first jig 61 and the second jigs 62, holes 68 are formed at corresponding locations so that bolts 67 pass therethrough. A reinforcing plate 69 is bonded to a peripheral portion of the first jig 61. Since the reinforcing plate 69 is bonded, it is possible to increase the strength while keeping the first jig 61 away from gaining weight.

The first jig 61 and the second jig 62 are placed in such a way that the coupling 22 is sandwiched therebetween and are connected with the bolts 67 that pass through the holes 68. Between the second jig 62 and the rotating shaft 31 which pierces through the center of the coupling 22, a hydraulic jack 60 is disposed. By stretching the hydraulic jack 60 in the direction in which the rotating shaft 31 extends, the coupling 22 is removed from the rotating shaft 31. In this manner, even if the coupling 22 is firmly fitted into the rotating shaft 31 by shrink fitting, it is possible to remove the coupling 22 from the rotating shaft 31. The coupling 22 may be removed after the periphery of the coupling 22 is heated to loosen the coupling's hold on the rotating shaft 31, or may be removed by the hydraulic jack 60 after the periphery of the coupling 22 is heated to loosen the coupling's hold on the rotating shaft 31.

Figure 8:
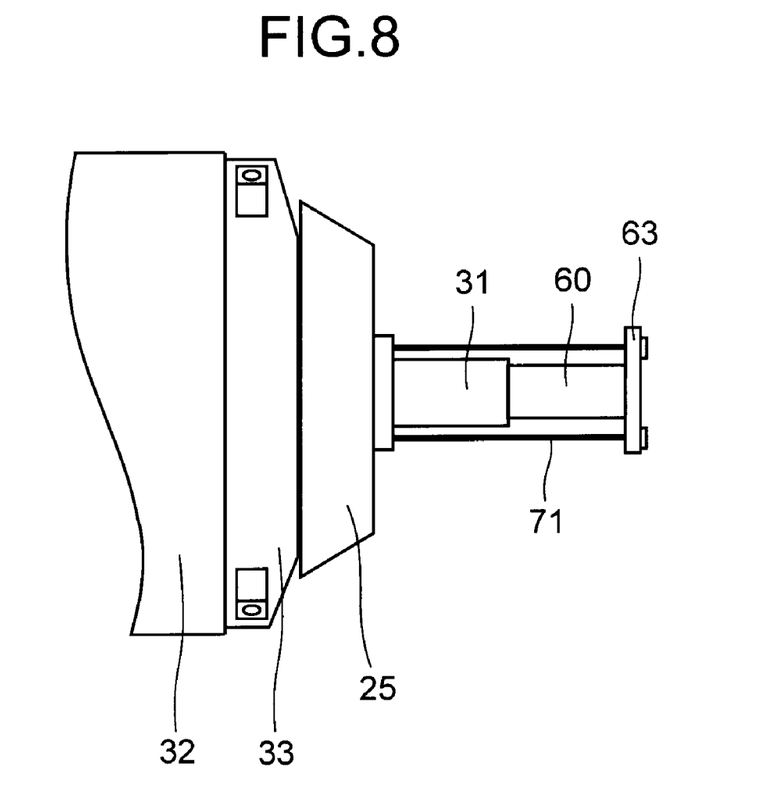
FIG. 8 is a side view of a situation where removing jigs are attached to an external fan according to an embodiment of the present invention.
Figure 9:
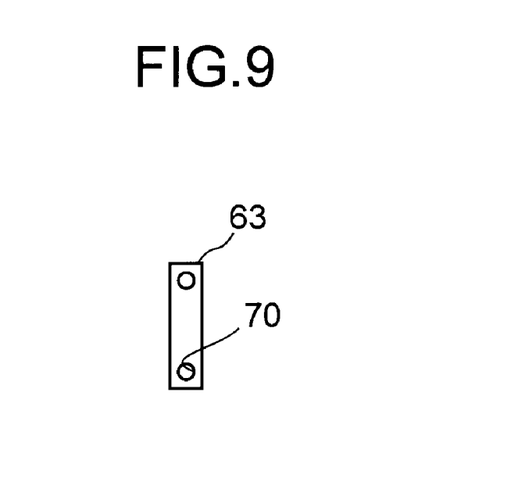
FIG. 9 is a front view of a third jig that is used to remove an external fan according to an embodiment of the present invention.

FIG. 8 is a side view of a situation where removing jigs are attached to an external fan according to the present embodiment. FIG. 9 is a front view of a third jig that is used to remove an external fan according to the present embodiment.

On the external fan 25, threaded holes are formed around the rotating shaft 31 so as to extend in the same direction as the rotating shaft 31. The third jig 63 for removing the external fan 25 is a plate on which holes 70 are formed at the locations corresponding to the above threaded holes. The third jig 63 for removing the external fan 25 is disposed so that the hydraulic jack 60 is sandwiched between an end of the rotating shaft 31 and the third jig 63, and is fixed to the external fan 25 by bolts 71 screwed into the threaded holes of the external fan 25. After the hydraulic jack 60 is stretched in the direction in which the rotating shaft 31 extends, the external fan 25 is removed from the rotating shaft 31. In this manner, even if the external fan 25 is firmly fitted into the rotating shaft 31 by shrink fitting, it is possible to remove the external fan 25 from the rotating shaft 31.

Figure 10:
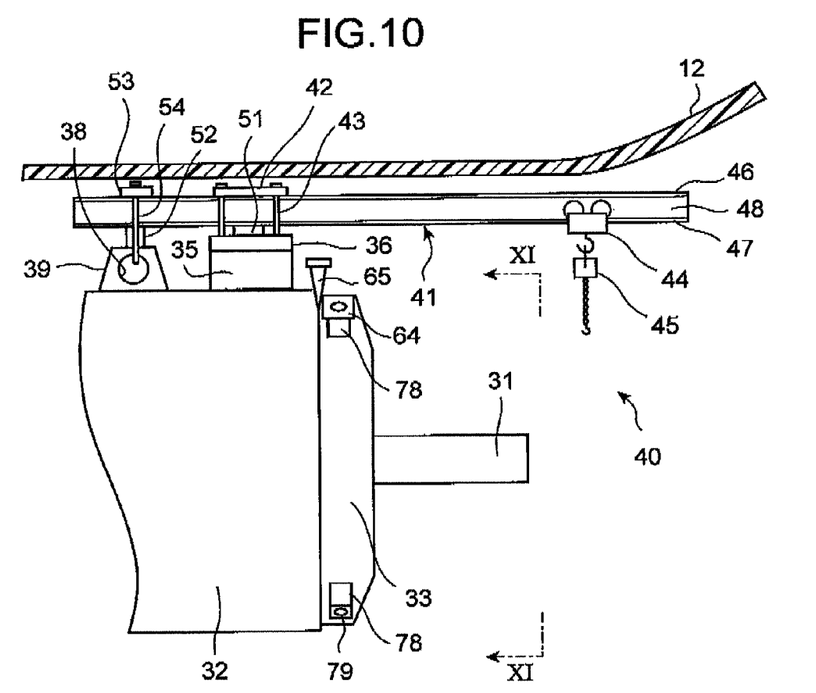
FIG. 10 is a side view showing a state where a removing jig is attached to a bracket according to an embodiment of the present invention, taken in the direction of the arrows X-X in FIG. 11.
Figure 11:
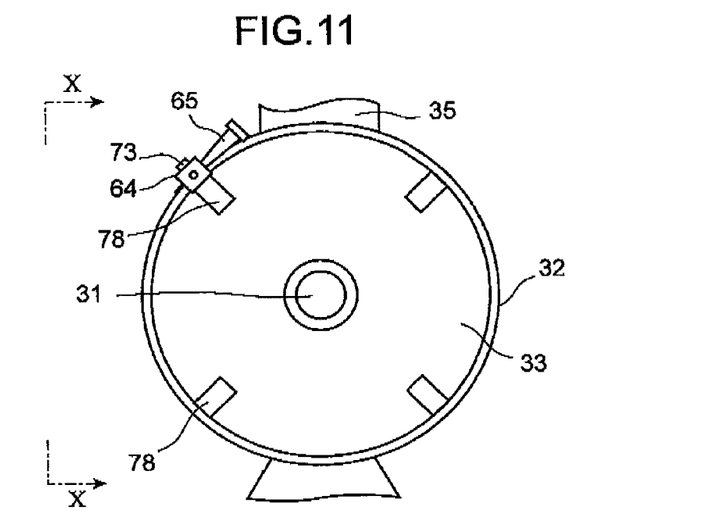
FIG. 11 is a front view taken in the direction of the arrows XI-XI in FIG. 10.
Figure 12:
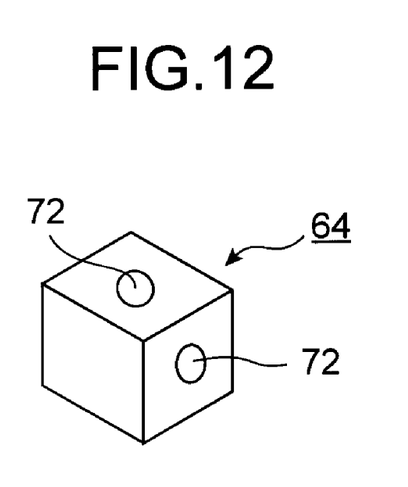
FIG. 12 is a perspective view of a fourth jig for removing a bracket according to an embodiment of the present invention.
Figure 13:
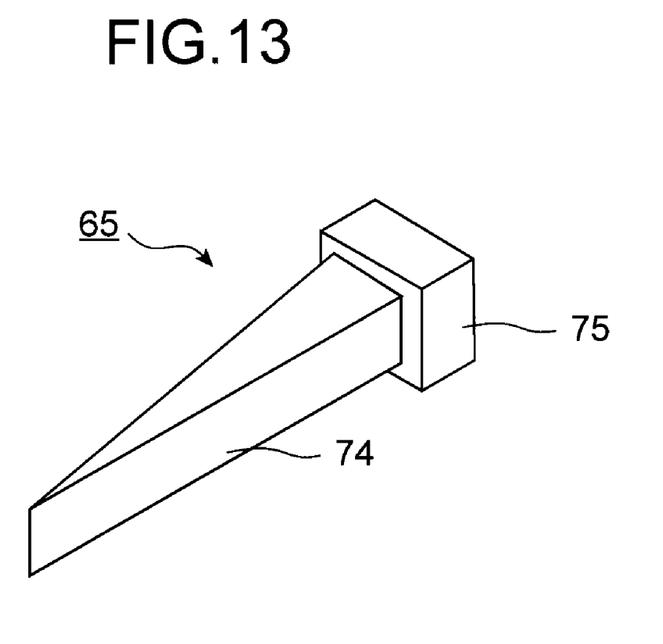
FIG. 13 is a perspective view of a fifth jig for removing a bracket according to an embodiment of the present invention.

FIG. 10 is a side view showing a state where a removing jig is attached to a bracket according to the present embodiment, taken in the direction of the arrows X-X in FIG. 11. FIG. 11 is a front view taken in the direction of the arrows XI-XI in FIG. 10. FIG. 12 is a perspective view of a fourth jig for removing a bracket according to the present embodiment. FIG. 13 is a perspective view of a fifth jig for removing a bracket according to the present embodiment.

On a fourth jig 64 for removing the bracket 33, through holes 72 that pierce through pair of faces of a rectangular parallelepiped that face each other. A fifth jig 65 for removing the bracket 33 has a wedge-shaped section 74 and a head section 75 that is fixed on the wedge-shaped section 74. On the bracket 33, blocks 79 on which a threaded hole 78 is formed in the direction perpendicular to the rotating shaft 31 are provided at intervals of 90 degrees around the rotating shaft 31.

The fourth jig 64 is fixed to the block 79 with a bolt 73 screwed into the threaded hole 78. Then, the wedge-shaped section 74 of the fifth jig 65 is inserted between the fourth jig 64 and the frame 32, and the bracket 33 gradually moves away from the frame 32 as the head section 75 is hit with a hammer or the like in the direction toward the wedge-shaped section 74. The same work is done on four blocks 79, and the bracket 33 is removed from the frame 32.

Figure 14:
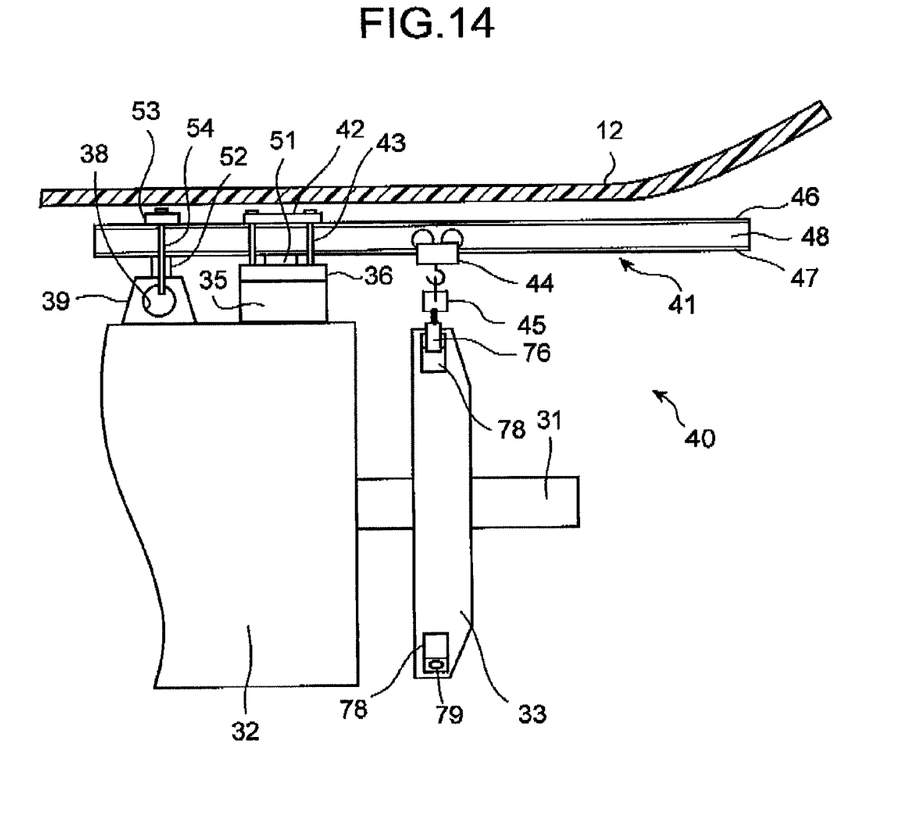
FIG. 14 is a side view of a situation where a bracket has been removed according to an embodiment of the present invention.
Figure 15:
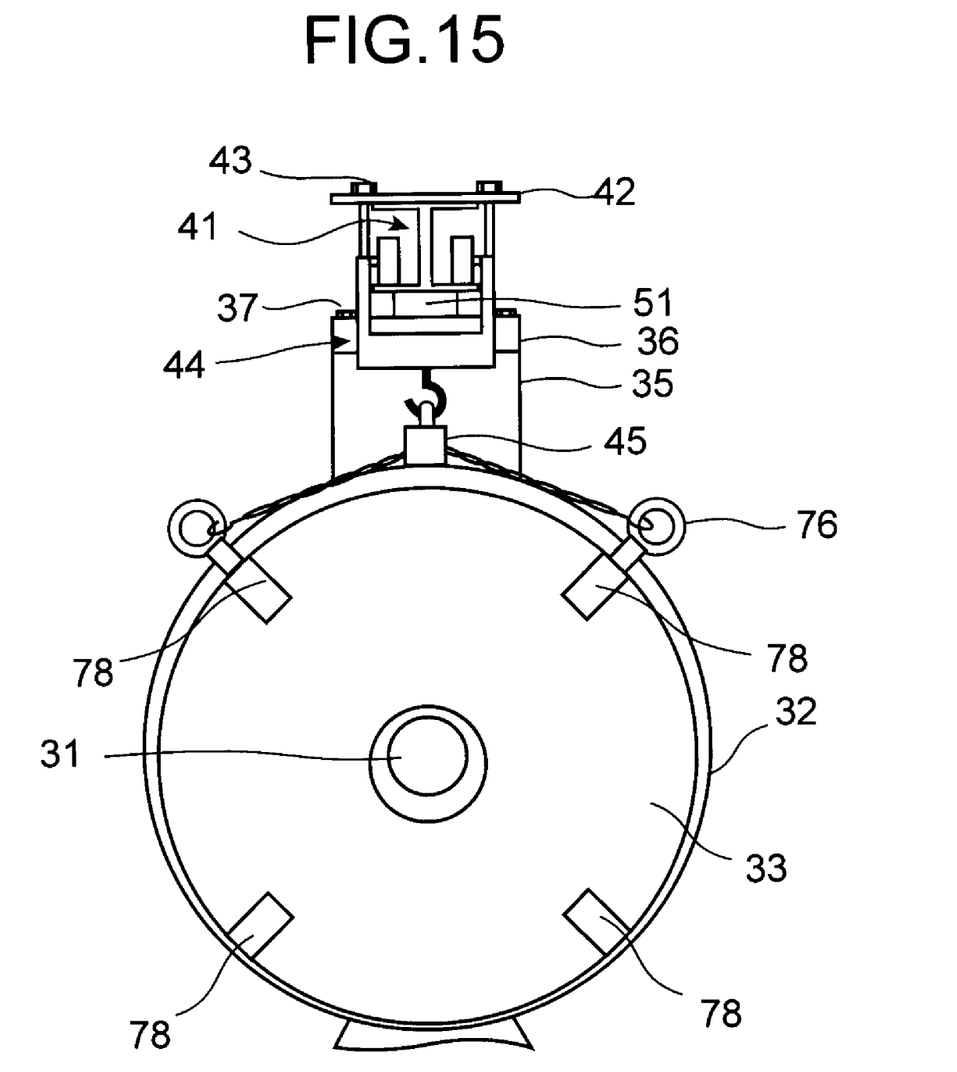
FIG. 15 is a front view of a situation where a bracket has been removed according to an embodiment of the present invention.

FIG. 14 is a side view of a situation where a bracket has been removed according to the present embodiment. FIG. 15 is a front view of a situation where a bracket has been removed according to the present embodiment.

Subsequently, swivel eye bolts 76 are attached to the threaded holes 78 of two upper blocks 79 of the bracket 33 that is removed from the frame 32. The swivel eye bolts 76 are hung on the chain blocks 45 hanging from the trolley 44. The bracket 33 is lifted by the chain blocks 45 and the trolley 44 moves along the I-shaped beam 41 to the tip of an end portion of the rotating shaft 31. Then, the bracket 33 is lowered by the chain blocks 45 and temporarily placed on the floor of the nacelle 12.

Figure 16:
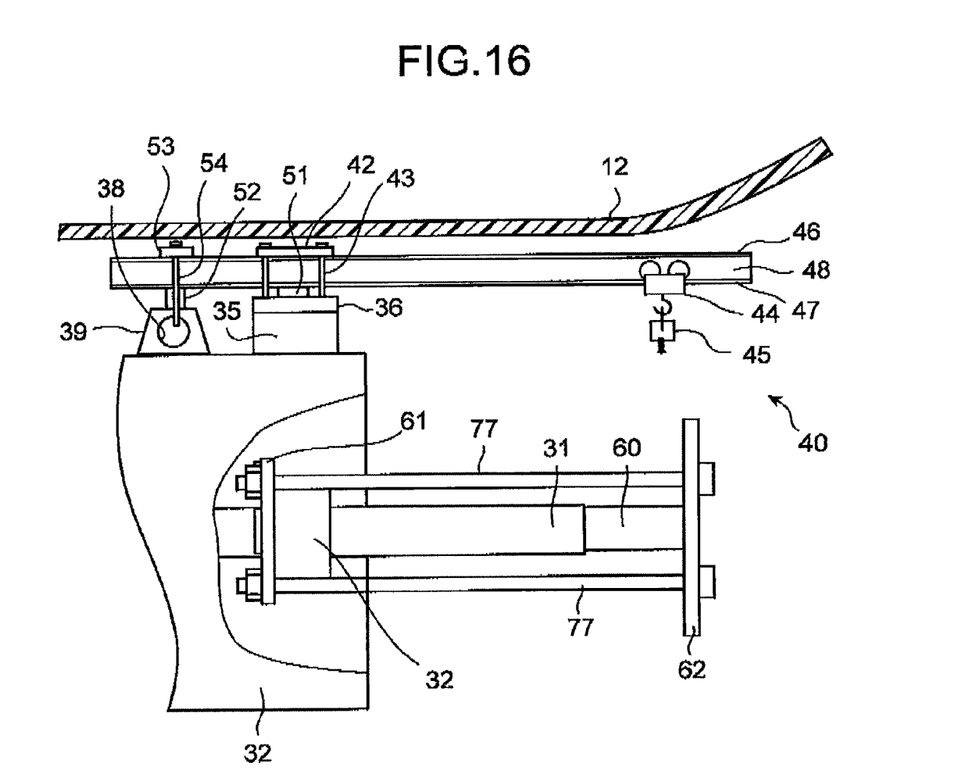
FIG. 16 is a side view of the frame which is partially cutaway showing a situation where a removing jig is attached to a bearing according to an embodiment of the present invention.

FIG. 16 is a side view of the frame which is partially cutaway showing a situation where a removing jig is attached to a bearing according to the present embodiment.

In order to remove a bearing 29 from the rotating shaft 31, the first jig 61 (see FIG. 6) and the second jig 62 (see FIG. 7), which are used to remove the coupling 22, are used. In addition to the holes 68 that are used to remove the coupling 22, other holes 68 are formed on the first jig 61 and the second jig 62. With pull-out bolts 77 passing through the holes, the first jig 61 and the second jig 62 are fixed together. The hydraulic jack 60 is placed between the second jig 62 and the rotating shaft 31. After the hydraulic jack 60 is stretched in the direction in which the rotating shaft 31 extends, the bearing 29 can be removed from the rotating shaft 31.

In that manner, the power generator 30 is disassembled. The disassembled power generator 30 is assembled after a new bearing 29 is attached. After the new bearing 29 is attached, the bearing 29 is filled with grease. Before the bracket 33 is attached, guide bolts are attached for position adjustment.

Then, the bracket 33 is lifted up by the chain blocks 45 so that the bearing 32 comes to the center of the bracket 33, the bracket 33 returns to a predetermined position as the trolley 44 moves. Then, the external fan 25 is put onto the rotating shaft 31 while the external fan 25 is heated. Similarly, the coupling 22 is heated and put onto the rotating shaft 31. By connecting the coupling 22 of the power generator 33 and the coupling 23 of the step-up gear 20 together, the rotating shaft 31 of the power generator 30 and the shaft 24 of the step-up gear 20 are coupled together. In this manner, the disassembly/assembly operation is completed.

As described above, when the disassembly apparatus of the rotating electric machine of the present embodiment is used, it is easy to carry the parts of the disassembly apparatus because these parts are light weight. For example, with the use of the I-shaped beam 41, the disassembly apparatus is made lighter than when a square beam with the same rigidity is used. If the I-shaped beam 41 used is made of lightweight material such as aluminum, the beam can be made lighter. Since the parts of the disassembly apparatus are light, the disassembly apparatus is more useful particularly when the disassembly apparatus is required to be installed at a high place as in the case of the wind power generation facility.

Since it is possible for the disassembly apparatus to be installed when there is a gap on the top surface of the rotating electric machine that is almost as high as the I-shaped beam 41, the disassembly apparatus can also be used for work in a limited space compared with the case where the leg members are provided on both sides of the rotating electric machine. Further, since the I-shaped beam 41 is used, the trolley 44 can be placed lower than the top surface of the beam, which makes it easier to carry out disassembly/assembly operation in a limited space.

In many cases, in the wind power generation facility, the inner wall of the nacelle is so formed as to match the shape of the power generator and step-up gear. Therefore, in some cases, the beam, which serves as a rail, cannot be put horizontally on the power generator and the step-up gear. Even in such cases, the disassembly apparatus according to the present embodiment enables it to provide the trolley which moves horizontally, and the chain block which serves as a crane and hangs from the trolley. Thus, it becomes easier to carry heavy parts such as the bracket 33.

Above mentioned embodiment is just an example, and the present invention is not limited to the embodiment and can be embodied in various forms.

The invention claimed is:

1. A disassembly apparatus of a rotating electric machine having a frame on which at least two threaded holes extended downward are formed, the disassembly apparatus comprising:
    an I-shaped beam having an upper flange, a lower flange and a web located between the upper flange and the lower flange and extending horizontally above the frame;
    a pressing plate disposed on the I-shaped beam;
    two anchor bolts positioned on opposite sides of the I-shaped beam, extending through the pressing plate and being screwed into the threaded holes;
    a trolley that can move by rolling on an upper surface of the lower flange; and
    a crane that hangs from the trolley.

2. The disassembly apparatus of the rotating electric machine according to claim 1, wherein the I-shaped beam is made of aluminum.

3. The disassembly apparatus of the rotating electric machine according to claim 2, wherein a lift section that is provided on a top surface of the frame and on which a lift hole piercing therethrough is formed, and further comprising:
    a fixing plate disposed on the I-shaped beam at a different position from the pressing plate in a direction in which the I-shaped beam extends; and
    a fixing member extending through the lift hole and being fixed to the fixing plate at two points across the I-shaped beam.

4. The disassembly apparatus of the rotating electric machine according to claim 3, wherein the crane is a chain block.

5. The disassembly apparatus of the rotating electric machine according to claim 2, wherein the crane is a chain block.

6. The disassembly apparatus of the rotating electric machine according to claim 1, wherein a lift section that is provided on a top surface of the frame and on which a lift hole piercing therethrough is formed, and further comprising:
    a fixing plate disposed on the I-shaped beam at a different position from the pressing plate in a direction in which the I-shaped beam extends; and
    a fixing member extending through the lift hole and being fixed to the fixing plate at two points across the I-shaped beam.

7. The disassembly apparatus of the rotating electric machine according to claim 6, wherein the crane is a chain block.

8. The disassembly apparatus of the rotating electric machine according to claim 1, wherein the crane is a chain block.

* * * * *